Sept. 6, 1927.  1,641,217

G. F. YEVSEYEFF

SHOCK ABSORBER

Filed Aug. 2, 1926

INVENTOR
George F. Yevseyeff

BY

ATTORNEY

Patented Sept. 6, 1927.

1,641,217

UNITED STATES PATENT OFFICE.

GEORGE F. YEVSEYEFF, OF WINDSOR, ONTARIO, CANADA.

SHOCK ABSORBER.

Application filed August 2, 1926. Serial No. 126,472.

My invention relates to shock absorbing devices which may be used in place of the usual vehicle springs.

It is a purpose of my invention to provide a shock absorbing device that is adapted to be used in place of or supplemental to the usual springs interposed between the frame and the axles of a vehicle. The shock absorbing device is so constructed that the same will act to oppose movement of the frame relative to the axle in either direction. In order to accomplish this purpose a double-acting spring is used and said spring is preferably made in the form of a flexible diaphragm which is mounted in a casing so as to divide the casing into a chamber on each side of the diaphragm. A suitable liquid, such as oil, is preferably placed in the chamber and means is provided for establishing communication between the chambers so as to permit the flow of the liquid from one chamber to the other, said means being preferably restricted so that the flow will take place at a relatively slow rate so that friction of the liquid in flowing through the passages will aid in centering the diaphragm, and in reducing the oscillation thereof.

It is a further purpose of my invention to provide a diaphragm in a shock absorbing device of the above mentioned character which is made up of a coiled resilient member with a piston rod engaging with the central portion of the coil, and the outer portion of the coil being in engagement with the casing in which the diaphragm is mounted. The flexible member preferably decreases in width from the outside to the center thereof to thus provide a diaphragm that is of less thickness in the center thereof than at the outside thereof.

It is another purpose of the invention to provide valve means in the passages that establish communication between the chambers on opposite sides of the diaphragm, which means is adjustable to regulate the flow of the liquid between the chambers.

Other objects and advantages of the invention will appear as the description of the accompanying drawings proceeds. However, I desire to have it distinctly understood that I do not intend to limit myself to the exact details shown or described, but I intend to include as part of my invention all such obvious changes and modifications of parts as would occur to a person skilled in this art and as would fall within the scope of the claims.

Figure 1:
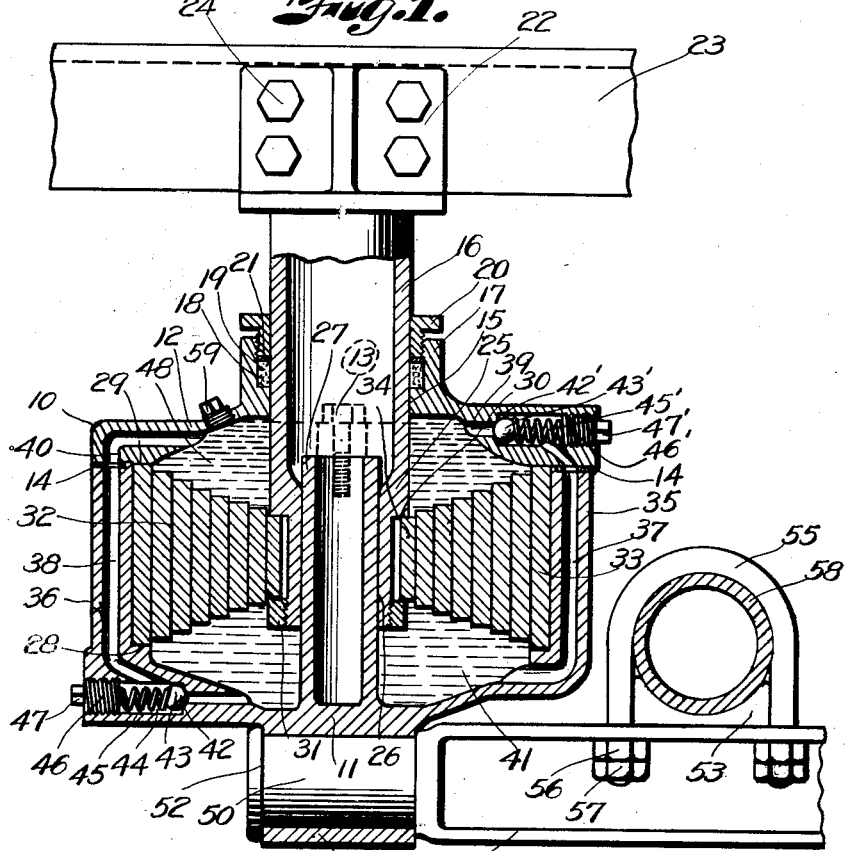
Fig. 1 is a vertical sectional view of my improved shock absorber, showing a portion of an axle and a frame to which the same is secured.
Figure 2:
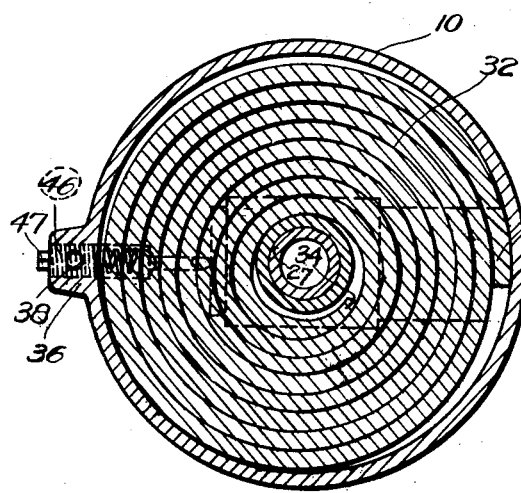
Fig. 2 is a horizontal sectional view thereof.
Figure 3:
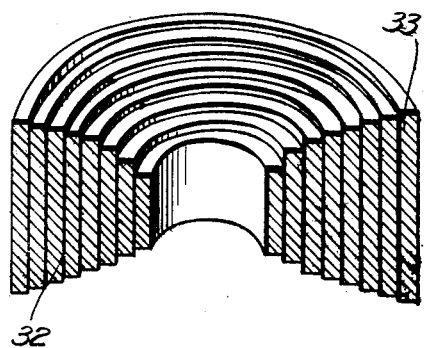
Fig. 3 is a perspective view, partly broken away, of the spring element.

Referring in detail to the drawings:

My improved shock absorber comprises a casing 10 which is substantially cylindrical in form and which has a closed end wall 11. A cover 12 is provided for the casing which is secured thereto in any suitable manner, as by means of the securing members 13. A gasket 14 may be interposed between the cover 12 and the casing 10 to provide a liquid tight joint therebetween, and the cover 12 is preferably provided with an opening 15 through which a tubular member 16 is adapted to extend, said member 16 serving as a piston rod and being in slidable engagement with the opening 15. Surrounding the opening 15 and projecting upwardly from the cover 12 is an annular flange 17 providing a groove 18 for a packing ring 19. A nut 20 screw threadedly engages with internal threads on the flange 17 and is adapted to compress the packing between itself and the walls of the groove 18, a washer 21 being interposed between the nut 20 and the packing ring 19.

The tubular member 16 is provided with a securing flange 22 at one end thereof, by means of which the same may be secured to a frame member 23, suitable securing members such as the bolts 24 being used for securing the member 22 to the frame member 23. The tubular member 16 is provided with a thickened lower end portion 25 having a reduced bore 26 therein within which the tubular guide rod 27 is slidably engaged, said guide rod being fixed on the end wall 11 of the casing and being preferably an integral upward projection thereon.

The side wall portion of the casing 10 is provided with an annular shoulder 28 that is adapted to act as a spring seat and the cover member 12 is provided with a flat annular face 29 which, when the cover is in position, acts as an oppositely arranged spring seat. The outer surface of the tubular member 16 at the thickened portion 25 thereof is cut away to provide a shoulder 30, and a screw threaded ring-like member 31 engages with the lower end of the member 16 to thus provide an annular groove extending around the member 16 and adapted to receive the inner end of the spring element.

The spring element comprises a coiled resilient member 32 which tapers gradually in width from the outer end 33 thereof to the inner end 34 thereof, the resilient member 32 being coiled in a similar manner to a clock spring with the turns thereof in close engagement so as to form a substantially liquid tight diaphragm, the turns being, however, not so tightly coiled that the same will not slide over each other to permit flexing of the entire resilient member in the direction of the axis of the coil. It will be seen upon reference to Fig. 1 that due to the gradually decreasing width of the resilient member 32 the diaphragm decreases in thickness from the outer periphery thereof where the same engages with the inner wall of the casing 10 to the center thereof where the same engages with the groove in the member 16, the diaphragm having a stepped appearance in cross section. Due to the fact that the shoulders formed by means of the ring 31 and the shoulder 30 on the member 16, as well as the shoulder 28 and the face 29 overlap the inner and outer coils of the spring, there will be substantially no leakage around the inner and outer ends of the spring and between the spring and the walls of the casing and the tubular piston rod 16.

The casing 10 is preferably provided with thickened portions 35 and 36 which are provided with the passages 37 and 38. The cover member 12 is provided with passages 39 and 40 communicating with the passages 37 and 38 respectively. The passage 37 opens into the chamber 41 which is formed between the end wall 11 of the casing and the diaphragm formed by means of the spring 32. The passage 38 also opens into said chamber 41 but a valve seat 42 is provided therein against which the ball valve 43 engages, said valve being mounted in a valve chamber 44 and being provided with a coiled compression spring 45 for holding the ball member on its seat. A screw threaded adjusting plug 46 is also provided for adjusting the compression of the spring 45 whereby the ease with which the valve 43 is opened is regulated. A similar valve seat 42' is provided in the passage 39 in the cover 12, the same being engaged by means of the ball valve 43' having the compression spring 45' engaging therewith, the compression of which is adjusted by means of the adjusting plug 46'. The plugs 46 and 46' are provided with suitably formed projections 47 and 47' thereon, whereby the same can readily be adjusted from outside the casing 10. The passages 40 and 39 open into the chamber 48 formed between the cover 12 and the diaphragm, the passage 40 opening directly into the chamber 48 while the passage 39 is normally closed to the chamber 48 by means of the valve 43'.

The end wall 11 of the casing 10 is provided with a depending bearing member 49 with which the rounded end 50 of the bracket member 51 engages, the same being headed over as at 52 to secure the same in position, or being provided with any suitable securing means for holding the bearing member 49 in position on the rounded end thereof. The bracket member 51 is provided with a threaded end with which the nuts 56 and lock nuts 57 engage, the U-shaped member 55 and the seat 53 engaging with opposite sides of the axle 58.

It will be seen that due to the fact that the bracket 51 can turn on the axis of the axle 58 and that the bearing 49 can turn on the axis of the rounded portion 50 of the bracket 51, a substantially universal connection is provided between the shock absorber and the axle, thus taking care of any relative motion between the axle and frame which might otherwise cause twisting of the shock absorber and frame.

In operation the shock absorber is filled with a suitable liquid such as oil which may be inserted through the screw threaded opening provided for the plug 59 or it may be supplied through any other suitable opening provided in the cover 12, the casing being preferably entirely filled with the liquid. The spring 32 forming the diaphragm will be normally in the position in Fig. 1. Upon movement of the frame 23 toward the axle 58 the member 16 will tend to move further into the casing 10 which movement will be resisted by the resilient member 23. Any displacement of the resilient member will cause some of the fluid in the chamber 41 to flow through the passage 38, past the valve 43 into the chamber 48, but due to the smallness of the passage 38, there will be considerable frictional resistance to this flow, and this may be varied furthermore by adjustment of the valve 43. The resilient member will then tend to return to its normal position but will be held from oscillating due to the fact that the return movement is cushioned by the liquid which returns to the chamber 41 from the chamber 48 through the passage 37, the valve 43' controlling the rate of flow through the passage and there being again a considerable amount of frictional resistance to the flow of the liquid. If the frame 23 tends to move away from the axle 58 the diaphragm will be distorted in the opposite direction, causing the liquid in the chamber 48 to flow into the chamber 41 and upon return of the spring to normal position the liquid in the chamber 41 will tend to return to the chamber 48, the action being similar to that previously described but in an opposite direction. As a result of this construction a spring action is obtained that while producing the desired shock absorbing effect, does not have the undesirable rebound that exists in the ordinary vehicle springs, and will produce a smoothness of action which is not possible with vehicle springs of the ordinary type. It is, of course, obvious that if desired the opposite end of the bracket 51 may be formed in a similar manner to the end shown, and a pair of shock absorbers may be used on each bracket 51 between itself and the frame 23. It will also be noted that due to the mounting of the resilient element in the chamber filled with oil the shock absorbing device is self-lubricating and will require no attention after its original installation and adjustment. The self-centering construction of the shock absorber will also tend to keep the body level.

While it is usually desirable to provide the liquid medium surrounding the spring 32 and utilize the same as a diaphragm, it may sometimes be desirable to dispense with such a medium and utilize my improved spring element in conjunction with a different mounting.

What I claim and desire to secure by Letters Patent is:

1. In a shock absorbing device, a casing, a piston rod in said casing, a yieldable resilient diaphragm connected with said piston rod and extending across said casing to divide the same into a pair of chambers, said diaphragm comprising a coiled resilient member, and valved means for establishing communication between said chambers.

2. In a shock absorbing device, a casing, a piston rod in said casing, a yieldable resilient diaphragm connected with said piston rod and extending across said casing to divide the same into a pair of chambers, said diaphragm comprising a coiled resilient member having one end thereof engaging said casing and the other end thereof engaging said piston rod, and valved means for establishing communication between said chambers.

3. In a shock absorbing device, a liquid tight casing, a piston rod in said casing, a yieldable resilient diaphragm connected with said piston rod and engaging the wall of said casing to divide the same into a pair of chambers, passages connecting said chambers to permit liquid to flow therethrough from one side of said piston to the other side thereof, and valves in said passages, one of said valves permitting flow of the liquid in one direction in one passage and the other valve permitting the liquid to flow in the opposite direction in the other passage.

4. In a shock absorbing device, a liquid tight casing, a piston rod in said casing, a yieldable resilient diaphragm connected with said piston rod and engaging the wall of said casing to divide the same into a pair of chambers, passages connecting said chambers to permit liquid to flow therethrough from one side of said piston to the other side thereof, valves in said passages, one of said valves permitting flow of the liquid in one direction in one passage and the other valve permitting the liquid to flow in the opposite direction in the other passage, and means for adjusting said valves.

5. In a shock absorbing device, a coiled resilient member, means for supporting the outer periphery of said resilient member, and means for supporting the inner portion of said resilient member, said means being relatively movable, said resilient member decreasing in width from the outside of the coil to the inside thereof.

6. In a shock absorbing member, a coiled resilient member forming a yielding diaphragm, a casing supporting the outer periphery of said diaphragm, and a piston rod engaging the diaphragm at the axial center thereof.

7. In a shock absorbing member, a coiled resilient member decreasing in width from the outside to the center of the coil to form a yielding diaphragm decreasing in thickness from the outside to the center thereof, a casing supporting the outer periphery of said diaphragm, and a piston rod engaging the diaphragm at the axial center thereof.

8. In a shock absorbing member, a coiled resilient member forming a yielding diaphragm, a casing supporting the outer periphery of said diaphragm, and a piston rod engaging the diaphragm at the axial center thereof, said coil being extensible in opposite directions.

9. In a shock absorbing member, a coiled resilient member forming a yielding diaphragm, a casing supporting the outer periphery of said diaphragm, and a piston rod engaging the diaphragm at the axial center thereof, said coil being extensible in opposite directions at the center thereof.

10. In a shock absorbing member, a coiled resilient member forming a yielding diaphragm, a casing supporting the outer periphery of said diaphragm, and a piston rod engaging the diaphragm at the axial center thereof, the outer periphery of the coil being extensible relatively to the center thereof.

11. In a shock absorbing member, a coiled resilient member forming a yielding diaphragm, a casing supporting the outer periphery of said diaphragm, and a piston rod engaging the diaphragm at the axial center thereof, the center and periphery of the diaphragm being extensible relatively to each other.

12. In a shock absorbing member, a coiled resilient member forming a yielding diaphragm, a casing supporting the outer periphery of said diaphragm, and a piston rod engaging the diaphragm at the axial center thereof, the center and periphery of the diaphragm being extensible in opposite directions relatively to each other.

In testimony whereof I affix my signature.

GEORGE F. YEVSEYEFF.